Nov. 6, 1934. C. I. JUSTHEIM Re. 19,362

INSULATED DISH

Original Filed Sept. 11, 1933

Inventor

Clarence I. Justheim

By R. M. Thomas

Attorney

Reissued Nov. 6, 1934

Re. 19,362

UNITED STATES PATENT OFFICE 19,362

INSULATED DISH

Clarence I. Justheim, Salt Lake City, Utah

Original No. 1,956,356, dated April 24, 1934, Serial No. 688,875, September 11, 1933. Application for reissue June 7, 1934, Serial No. 729,491

3 Claims. (Cl. 65—59)

My invention relates to dishes and containers and has for its object to provide a new insulated dish which will be strong in construction and economical to manufacture.

A further object is to provide a closed container in which either hot or cold ingredients or liquids may be placed and kept at the same temperature at which they were inserted in the container.

A still further object is to provide a container for foods or liquids which may be covered if desired and which may be provided with a mechanical beater therein to stir the fluids in the container if desired.

A still further object is to provide an insulated dish which is provided with an insulated cover therefor and which may be used to hold certain temperatures in the food for a long period of time so that foods such as frozen ice cream may be placed in the dish and placed away for some time without the frozen cream melting.

A still further object is to provide a dish in which the insulating medium is that of separated dead air spaced with thin sheets of metallic material therebetween with each surface of the material highly glossed or polished into a reflecting surface. Thin sheets of aluminum may be used as the metallic medium and each sheet of aluminum may be embossed or may be peened, or die cut with the inner surface or that face toward the inner portion of the dish formed concave and the outer surface formed convex.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention, Figure 1 is a diametrical section through one of the dishes with a closed cover thereon showing the various sheets of insulated material sectioned.

Figure 1:
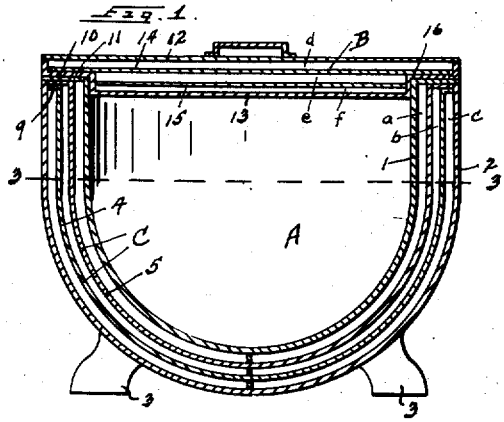

In the drawing I have shown the dish as a bowl A, having a cover B for the top thereof. The bowl A is made of an inner wall 1, spaced from an outer wall 2, with legs 3 on the outer wall to support the bowl. The outer upper edge of the outer wall 2 is the surface to which the insulating plates C are secured and the insulating plates 4 and 5 are set between the two walls 1 and 2 with air spaces *a*, *b*, and *c* separating the insulating plates from each other and from the inner and outer walls of the bowl A. The plate 4 is provided with a flange 9 around the top edge thereof by which it is secured to the outer wall of the bowl by suitable means such as solder, hydrolene, welding etc. The next plate 5 is also provided with a flange 10 therearound to fit onto the flange 9 and also be secured to the outer wall of the bowl, and the inner wall 1 of the bowl is provided with a flange 11 to fit onto the flange 10 and be secured to the upper edge of the outer wall of the bowl to complete the entire bowl.

This seals the inner and outer walls 1 and 2 together leaving dead air space between the wall 1 and the plate 5, between the plates 4 and 5 and between the wall 2 and the plate 4, providing the dead air spaces, *a*, *b*, and *c*.

The cover B is made of flat plates 12 and 13 set apart by insulating plates 14 and 15, with dead air spaces *d*, *e*, and *f* therein. The plate 13 on the under side of the cover is formed with an annular step 16 there around to allow the cover to fit partly down into the bowl A and partly thereover to completely seal the cover to the bowl. If need arises a sealing medium may be provided on the step 16, such as a cork or rubber gasket.

Figure 2:
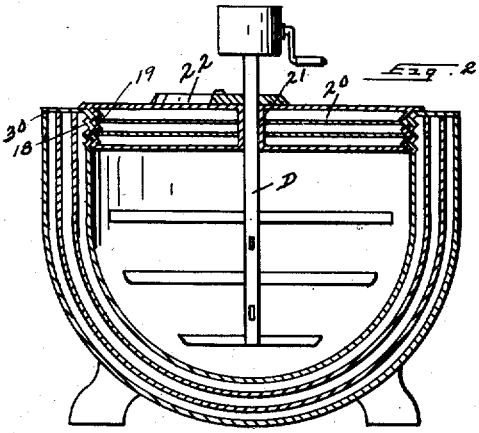
Figure 2 is a vertical section of a dish showing one method of providing a mechanical agitator or beater therefor.
Figure 3:
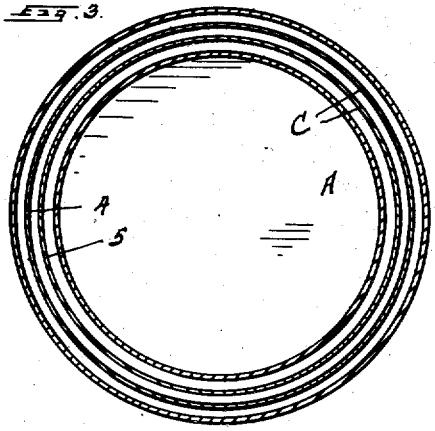
Figure 3 is a section on line 3—3 of Figure 2.

In Figure 2 the inner upper surface of the inside portion or plate of the bowl is formed into threads 18 into which the threads 19 of the cover 20 may be screwed to secure the cover to the bowl. A mechanical mixing or stirring device D is shown inserted through the cover through an opening 21 therein, the mixing device to be removed if desired and a plate 22 on the top of the cover moved over to close the opening. The inner wall of the bowl is provided with a flange on the top edge thereof to seal to the outer wall at 30 to provide the sealed dead air spaces therein.

Figure 4:
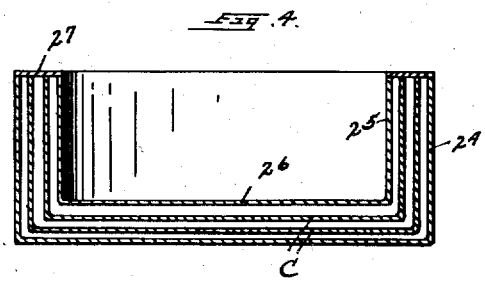
Figure 4 is a vertical section of a dish formed with flat bottom and vertical sides.

In Figure 4 the walls 25 of the bowl are perpendicular and the bottom 26 is formed flat with the side walls 25 and the bottom 26 integral and with the insulating plates C formed into like shape and carried between the walls 24 and 25. This form of bowl being shown merely to illustrate that the scope of the invention does not lie only in one shape. The dead air spaces between the plates and walls of the bowl are sealed by the flat annular plate 27 being secured thereto by suitable means.

Figure 5:
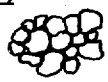
Figure 5 is a face view of the peened surface of one of the aluminum insulating plates.
Figure 6:
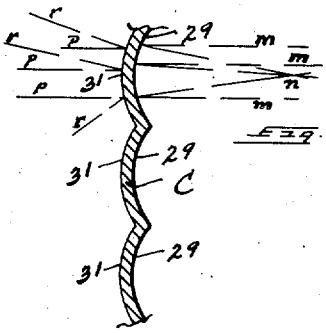
Figure 6 is a sectional view of one of the plates when enlarged to show the concave and convex surfaces and the direction of the rays reflected therefrom.
Figure 7:
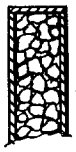
Figure 7 is a section of a dish showing other kinds of insulating, such as cork used therein.

In Figures 5 and 6, I have shown the insulating plate as made of sheets of very thin aluminum having the surfaces either embossed or peened.

In Figure 6 the section of the insulation shows a portion of one insulation sheet greatly enlarged to show the form of the concave and convex facets formed therein. These facets are made concave at 29 on the inner surface of the plates C and the outer surface is formed into convex facets 31 so that rays of light or heat shown as *m* hitting the inner surface strike the concave facets 29 and are reflected in concentrated rays, converging at *n* while those rays *p* striking the outer surface of the sheet will engage the convex facets 31 and be dispersed as rays *r* to disperse the heat or cold. Thus if the insulation is being used to hold the cold, the cold rays will be concentrated inwardly and the heat rays will be dispersed outwardly.

The concave facets on the inner surface reflect either heat or cold trying to leave the bowl and directs them back thereinto, converging the heat or cold rays instead of dispersing them, and the convex facets disperse all heat or cold rays trying to pass therethrough.

Having thus described my invention I desire to secure by Letters Patent and claim:

1. In a dish of the class described, the combination of an inner wall formed of a curved sheet and an outer wall formed of a like sheet larger in diameter, with the space between the two sheets sealed; sheets of spaced apart highly polished thin aluminum, having the inside face formed with concave facets and the other face convex facets, carried in the space between the inner and the outer wall; and means to hold the aluminum apart.

2. In a dish of the class described, the combination of an inner wall formed of a curved sheet and an outer wall formed of a like sheet larger in diameter, with the space between the two sheets sealed; sheets of spaced apart highly reflective thin aluminum having the faces thereof peened into irregular facets, carried in the space between the inner and outer wall; and means to hold the sheets spaced apart.

3. In a dish of the class described, the combination of an inner wall formed of a curved sheet and an outer wall formed of a like sheet of larger diameter, with the space between the two sheets sealed; sheets of spaced apart highly reflective aluminum carried in the space between the walls, the sheets having the surfaces thereof formed into irregular embossed facets; means to space the aluminum sheets apart; and a cover for said dish formed of like construction.

CLARENCE I. JUSTHEIM.